United States Patent

[11] 3,624,432

| [72] | Inventor | Karl Merz<br>Mannheim-Waldhof, Germany |
|---|---|---|
| [21] | Appl. No. | 886,502 |
| [22] | Filed | Dec. 19, 1969 |
| [45] | Patented | Nov. 30, 1971 |
| [73] | Assignee | Aktiengesellschaft Brown, Boveri & Cie<br>Baden, Switzerland |

[54] ARRANGEMENT FOR SECURING ELECTRICAL CONDUCTOR BARS WITHIN SLOTS TO PREVENT VIBRATION
13 Claims, 5 Drawing Figs.

[52] U.S. Cl. .................................... 310/53, 310/51, 310/66, 310/203, 310/214
[51] Int. Cl. .................................... H02k 9/00
[50] Field of Search .................................... 310/51, 54, 52, 58, 65, 64, 203, 53, 213, 214, 206, 207, 205, 192, 59, 66

[56] References Cited
UNITED STATES PATENTS

| 2,727,161 | 12/1955 | Kilner | |
| 2,821,641 | 1/1958 | Ringland | 310/54 |
| 2,873,393 | 2/1959 | Baudry | 310/213 |
| | | | 310/64 |
| 2,975,308 | 3/1961 | Kilbourne | 310/53 |
| 2,988,656 | 6/1961 | Grobel | 310/53 |
| 2,999,945 | 9/1961 | Heller | 310/53 |
| 3,010,038 | 11/1961 | Manni | 310/53 |
| 3,214,617 | 10/1965 | Tudge | 310/64 |
| 3,488,532 | 1/1970 | Endress | 310/213 |
| | | | 310/58 |

Primary Examiner—D. F. Duggan
Assistant Examiner—R. Skudy
Attorney—Pierce, Scheffler & Parker

ABSTRACT: A dynamoelectric machine including an arrangement for securing conductor bars in their respective slots in the iron body thereof for preventing conductor vibration. A tubular member is located in each slot and extends parallel with the conductor bar. The tubular member is made from an elastic nonmagnetic material and is connected to a fluid pressure source by means of which the fluid pressure established within the tubular member is imparted to the conductor bar. The fluid pressure within the tubular members may be static, i.e. noncirculating, or the pressurized fluid, either liquid or gas, may be made to circulate through the tubular members, in which case a cooler unit may also be incorporated in the circulating system so as to remove heat developed in the slots by the conductor bars and which is transferred to the fluid.

PATENTED NOV 30 1971 3,624,432

INVENTOR.
Karl Merz
BY
Pim, Schiffler & Parker
Attorneys

3,624,432

ARRANGEMENT FOR SECURING ELECTRICAL CONDUCTOR BARS WITHIN SLOTS TO PREVENT VIBRATION

This invention relates to electrical apparatus of the type in which electrical conductors are seated in slots in an iron body of the apparatus, and more particularly to an improved arrangement for securing the conductors in the slots so as to minimize the chances for setting up vibrations which can lead to destruction of the conductor insulation. The invention is applicable to various types of electrical apparatus in which conductors are seated in slots and is of particular significance when incorporated in the iron structure of dynamoelectric machines which include radially extending slots which open at the surface and in which electrical conductors forming the winding are seated. After the conductors have been seated in the slots, the mouths of the slots are closed by keys which can be made of any suitable material such as fiberglass-reinforced plastic. In the course of time, these keys, as well as the electrical insulation on the conductors, undergo a certain amount of shrinkage with the result that the slot cavity is no longer completely filled by the conductors and keys and this can lead to highly destructive vibrations of the conductors due to the reactive forces created between the conductor current and magnetic flux in the iron. As indicated above, such vibrations would, in the course of time, lead to destruction of the conductor insulation which would thus create an iron short circuit which would necessitate taking the machine out of operation for repairs.

It has thus been the practice to adopt preventative maintenance measures in which the machine is periodically taken out of operation to have the slots rekeyed so as to again secure the conductors firmly in the body slots. It has also been the practice to adopt various measures which prevent conductor vibration in the slots notwithstanding the shrinkage effects of conductor insulation and/or the slot-closing keys. For example, it has been proposed to cement the conductors in the slots with a casting resin. Also, it is known to reduce the clearance between conductor and slot wall by means of a lateral lining of hard inserts made from insulating material. It has further been suggested to eliminate clearance between the conductor and slot wall by inserting shims of nonmagnetic material which press elastically against the conductors. This expedient, as described in German Pat. No. 964,161, works well where Roebel conductors and other similar types of synthetic insulated conductors are involved since these have a certain elasticity in a radial direction thus favoring a working of the winding in the radial direction.

It is further known to provide a closure member for the conductor slot in the form of a hose made from an elastic material, particularly silicon rubber, which presses the conductors firmly against the base of the slot in a radial direction. This expedient is disclosed in German Pat. No. 967,528. However, the force which such a slot closure member is capable of exerting in a radial direction is limited and uncontrollable. Moreover, in these various already known arrangements, there exists an inherent disadvantage in that it is not possible to periodically check on the condition of the keys from the exterior of the machine.

The principal object of this invention is to provide an improved arrangement for fixing the conductors securely within their slots in such manner that the conductors are continuously pressed against the base of the slot with a constant and uniform radial pressure, and in such manner as to make supervision of this pressure possible on a continuing basis. This objective is realized, in accordance with the invention, in that the slot space below the slot-closing key is filled out by the conductor material, which may consist of one or more separate conductor bars, and an elastic tubular member extending lengthwise of the slot, the tubular member being subjected to an internal pressure from a pressurized fluid which fills the interior of the tube with a constant pressure so as to establish a constant pressure in the radial direction of the slot upon the conductor bar or bars in the slot. A fluid pressure generator whose output can be controlled is utilized for filling the tubular member with the pressurized fluid at a constant pressure. In the course of time, as the conductor insulation and/or the slot-closing key shrinks, thus correspondingly reducing the overall slot space which they occupy, the output of the pressure generator to the elastic tube in the slot will be correspondingly increased so as to take up and thus compensate for this space reduction and hence maintain the same radial pressure on the conductors so as to prevent them from vibrating.

While it is true that inclusion of the elastic tube within the slot necessitates space in the radial direction, larger machines, at least, require a so-called pregroove for magnetic reasons and within which the elastic tube can be accommodated. Thus, at least with respect to the larger machines, no increase in slot dimension in the radial direction is required in order to incorporate the invention.

The elastic tubes located in the conductor slots may take different forms, the pressure medium filling the tubes may also be selected from various types of fluid, and the tubes may be located at different radial positions within the slot.

The tube may, for example, consist of a single, inner hollow space which may have a rectangular configuration, or multiple hollow spaces located side-by-side in an axial direction of the machine.

As to location, the elastic, fluid pressurized tube may be located between the slot-closing key and the insulated electrical conductor, or between two conductors occupying adjacent radial positions within the slot, or between the base of the slot and the radially innermost conductor.

As to the type of fluid, one may choose between a liquid such as deionized water, or oil, or a gas such as carbon dioxide.

As to arrangement of the tubes, the tubes in adjacent conductor slots in the body of the rotor may be connected all in series, or all in parallel, to the same fluid pressure generator by suitable manifolding of the tube ends, the manifolding at one end of the tubes being connected to the pressure generator, and the manifolding at the opposite ends of the tubes being connected to a vent valve which is closed during operation of the machine to establish a noncirculating system.

In another arrangement of a noncirculating system, the tubes may be connected in series-parallel to the same pressure generator.

In yet another arrangement, the tubes may be connected all in series to establish a system for circulating the pressurized fluid through the tubes from a common pressure generator. With such a circulation system, one may then incorporate a cooling device for cooling the fluid after passing through the tubes, thus forming a means for dissipating heat produced in the slots by current flow through the conductors. As a further implementation, provision can be made for including a compensating vessel in the fluid circulating system.

The foregoing as well as other objects and advantages inherent in the invention will become more apparent from the following detailed description of various suitable embodiments thereof as applied to a slotted iron body component of a dynamoelectric machine having two conductors per slot, and from the accompanying drawings wherein.

Figure 5:
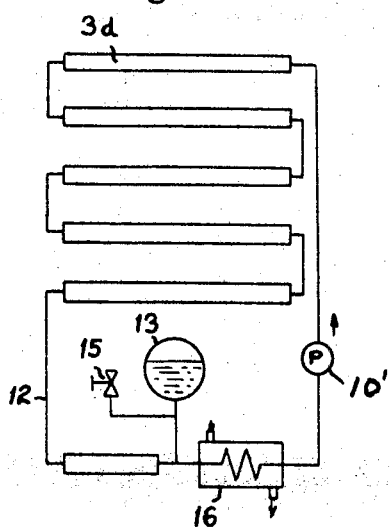
Figure 4:
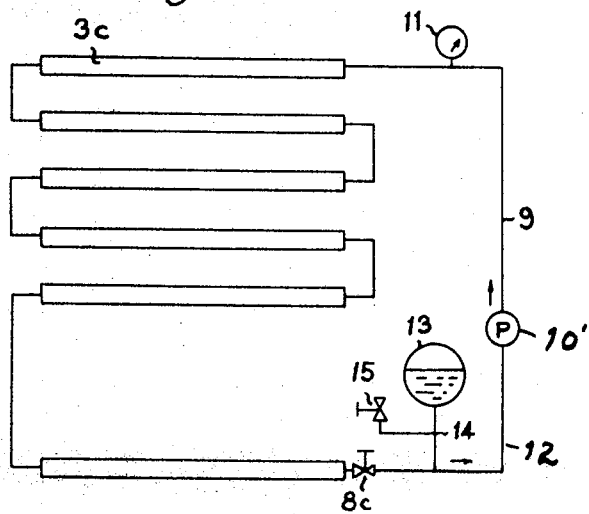

FIG. 4 is also a schematic view illustrating a system wherein all of the tubes are connected in series and arranged in such manner that the pressure fluid circulates through the tubes from the pressure generator in a closed circuit; and FIG. 5 is likewise a schematic view illustrating a tube arrangement similar to that depicted in FIG. 4 but which includes, in addition, a cooling device for the fluid so as to extract heat imparted to the fluid as it passes through the slots in heat-transfer relation with the slot conductors.

Figure 1:
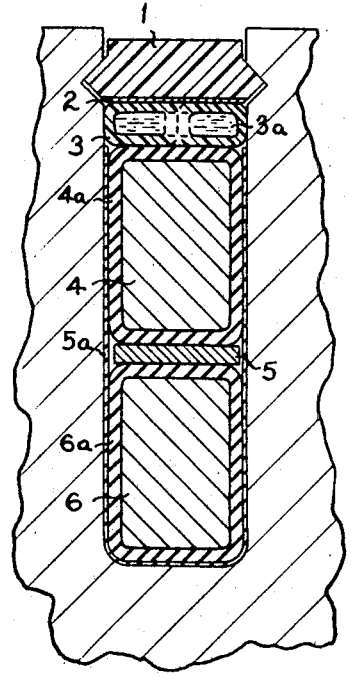
FIG. 1 is a view in section of one of the conductor slots taken transverse to the centerline of the machine.

With reference now to the drawings, and in particular to FIG. 1, the radially extending slot in the iron body is seen to be closed at its mouth by a double-conical key 1. A flat inert 2 is disposed between the underface of the key 1 and the upper surface of the tubular member 3 which latter is made from an elastic nonmagnetic material. It is seen to have a rectangular configuration in cross section and the cavity within the tube is designated 3a. The tubular member 3 has an elastic characteristic and can be made from a synthetic resin type of plastic material. If the tube is made from nonmagnetic metal, it must be divided into separate tubes in a side-by-side tangential relation as indicated by the dotted lines. Two electrical conductor bars 4 and 6, for example copper, provided with insulation layers 4a, and 6a respectively, are located in the slot and these are separated from each other in the radial direction by means of a flat insert 5. The insulating layer 4a on the radially outermost conductor bar 4 lies in contact with the lower surface of the rectangularly configured tubular member 3. Thus, key 1, inserts 2 and 5, the insulated conductor bars 4 and 6, the tubular member 3 and a slot liner 5a serve to completely fill the slot. Now when the tubular member 3 is pressurized by the fluid within its interior 3a, it serves to apply a pressure directed radially towards the conductors 4 and 6 which prevent the latter from vibrating notwithstanding the fact that in the course of time the insulation layers 4a and 6a, and perhaps the key 1 also may undergo some shrinkage, provided, of course, that the tube 3 is expanded correspondingly to compensate for such shrinkage.

Figure 2:
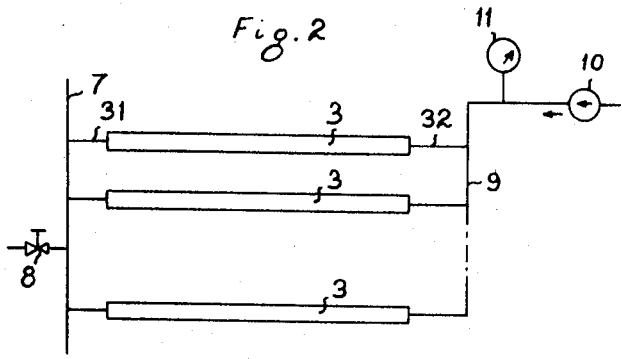
FIG. 2 is a schematic view illustrating one mode of connecting all of the elastic tubes in the slots in parallel to the fluid pressure generator to establish a noncirculating system.

The tubular members may be arranged in various manners for fluid pressurization. FIG. 2 illustrates an arrangement wherein all of the tubes 3 (it being understood that a separate tube is provided for each slot in the iron body) are connected in parallel to the same fluid pressure generator by suitable manifolding of the tube ends, the manifolding 9 at one end of each of the tubes being connected to the fluid pressure generator 10 whose output pressure is controllable, and the manifolding 7 at the opposite end of each of the tubes being connected to a valve 8 which is kept closed during operation of the machine. The pressure generator 10 forces a gas such as carbon dioxide, or a liquid such as water or oil into all of the tubes 3 at the pressure determined by generator 10 so that the conductor bars in all of the slots are pressed against the base of the slot with the same radially directed pressure. The fluid pressure from generator 10 is maintained at a constant level by means of a suitable pressure regulating device therefor which is set to a selected adjustable value. Connected to the manifolding 9 between the tubes 3 and pressure generator 10 is a pressure indicating instrument 11 which, for example, can be incorporated into the control console for the machine.

Figure 3:
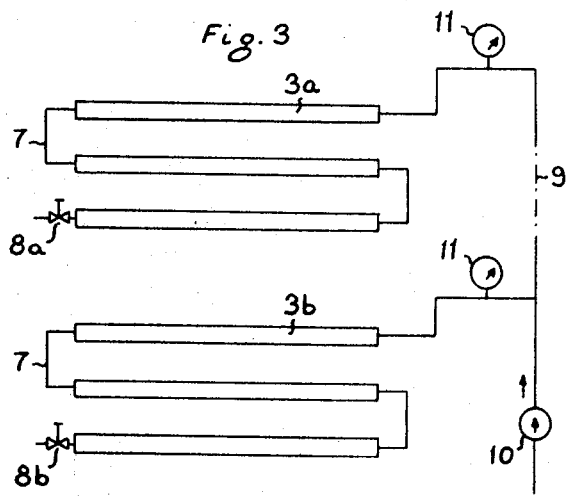
FIG. 3 is also a schematic view illustrating a somewhat different arrangement of a noncirculating system wherein the tubes are arranged in a series-parallel mode of connection to the pressure generator.

FIG. 3 shows a somewhat different arrangement operating on the same principle as that of FIG. 2 but wherein a series-parallel arrangement of tubes is utilized. A first section of series connected tubes 3a is connected by line 9 to the pressure generator 10, and a second section of series connected tubes 3b is also connected to line 9, thus placing the first and second tube sections 3a, and 3b in parallel with respect to the fluid supply from generator 10. Each of the sections is provided with a pressure indicating instrument 11, and each section 3a, 3b of series connected tubes terminates in a valve 8a, 8b, respectively which is kept closed during operation of the machine.

FIGS. 2 and 3 illustrate different arrangements of noncirculating systems for the pressurized fluid.

The embodiments illustrated in FIGS. 4 and 5 differ from those of FIGS. 2 and 3 in that means are provided for circulating the pressurized fluid through the tubes. In the embodiment of FIG. 4, it is seen that all of the tubes 3c are connected in series, the outlet from the pressure generator e.g. pump 10', being connected via line 9 to the inlet end of the first of the series connected tubes, and the outlet end from the last of tubes in the series being connected via line 12 to the return side of the pump. A pressure indicating device 11 is connected to the pump outlet line 9, and a compensating vessel 13 is connected via line 14 to the return line 12, the line 14 including a venting valve 15. A valve 8c can be included at the outlet end of the last tube, i.e. the tube end connected to the return line 12, if desired. This valve would be maintained in an open position when it is desired to operate the tube system on a fluid circulating basis. However, if the valve 8c is closed, a noncirculating system would be established, similar to that of FIGS. 2 or 3—but with all tubes connected in series.

The embodiment illustrated in FIG. 5 is similar to that of FIG. 4 in that a circulating system is provided for sending the pressurized fluid from the pump 10' through all of the tubes 3d connected in series. In addition, a cooling device 16 is incorporated in the return line 12 to the pump 10' for removing the heat transferred to the pressurized fluid from the slot conductors 4,6.

In the arrangement according to FIGS. 4 and 5 in which a pump is employed to pressurize the fluid, the pump pressure can be controlled by a conventional adjustable valve controlled bypass from the pump outlet back to the inlet side of the pump.

I claim:

1. An arrangement for securing conductor bars in their respective radially extending slots in the iron body of a dynamoelectric machine to prevent vibration of the conductor bars, the entrance end to each slot being closed by a key extending along the slot, the slot space between the key and the base of each said slot including a fluid-filled tubular member made from elastic nonmagnetic material extending lengthwise in the slot for completely filling out said slot, a fluid pressurizing generator connected to each elastic tubular member for establishing preselected constant pressure on the fluid within said tubular member thus effecting elastic deformation of said tubular member in a radial direction, and from which deformation a corresponding pressure acting in the radial direction of said slot is imparted to said conductor bar.

2. A conductor bar securing arrangement as defined in claim 1 wherein the cross section of said elastic tubular member has a rectangular configuration.

3. A conductor bar securing arrangement as defined in claim 1 wherein said elastic tubular member is made from a synthetic resin.

4. A conductor bar securing arrangement as defined in claim 1 wherein a gas such as carbon dioxide serves as said pressurized fluid within said tubular member.

5. A conductor bar securing arrangement as defined in claim 5 wherein said fluid pressurized tubular member is located within said slot between said slot-closing key and the electrical conductor bar.

6. A conductor bar securing arrangement as defined in claim 1 and wherein said tubular members are connected in common to the same fluid pressurizing generator.

7. A conductor bar securing arrangement as defined in claim 6 wherein said tubular members are connected in parallel to said common fluid pressurizing generator.

8. A conductor bar securing arrangement as defined in claim 6 wherein said tubular members are connected in series to said common fluid pressurizing generator.

9. A conductor bar securing arrangement as defined in claim 6 wherein said tubular members are connected in series-parallel to said common fluid pressurizing generator.

10. A conductor bar securing arrangement as defined in claim 1 wherein each said tubular member is connected at one end to said fluid pressurizing generator and the other end thereof is connected to a valve which is kept closed during operation of the device thereby establishing a noncirculating type of fluid feed to said tubular members from said generator.

11. A conductor bar securing arrangement as defined in claim 10 wherein said tubular members are connected in parallel and which further includes manifolding at one end of said tubular members for connecting them to said fluid pressurizing generator and manifolding at the other end of said tubular members for connecting them to said valve.

12. A conductor bar securing arrangement as defined in claim 10 wherein said tubular members are arranged in a plurality of groups of series connected tubular members and said groups are connected in parallel, one end of each group of series connected tubular members being connected to said fluid pressurizing generator and the other end of each group of series connected tubular members being connected to said valve.

13. A conductor bar securing arrangement as defined in claim 1 wherein a liquid serves as said pressurized fluid within said tubular member.

* * * * *

UNITED STATES PATENT OFFICE
CERTIFICATE OF CORRECTION

Patent No. 3,624,432     Dated November 30, 1971

Inventor(s) Karl Merz

It is certified that error appears in the above-identified patent and that said Letters Patent are hereby corrected as shown below:

Claim 5, line 2, Claim 5 is cited instead of Claim 1

Signed and sealed this 23rd day of May 1972.

(SEAL)
Attest:

EDWARD M. FLETCHER, JR.     ROBERT GOTTSCHALK
Attesting Officer     Commissioner of Patents